April 8, 1958 W. H. WEST 2,829,626
ALTERNATOR VALVE ASSEMBLY FOR A FLUID PRESSURE
OPERATED WINDSHIELD WIPER MOTOR
Filed Jan. 12, 1956 5 Sheets-Sheet 1

INVENTOR.
WALTER H. WEST
BY
Craig V. Morton
ATTORNEY

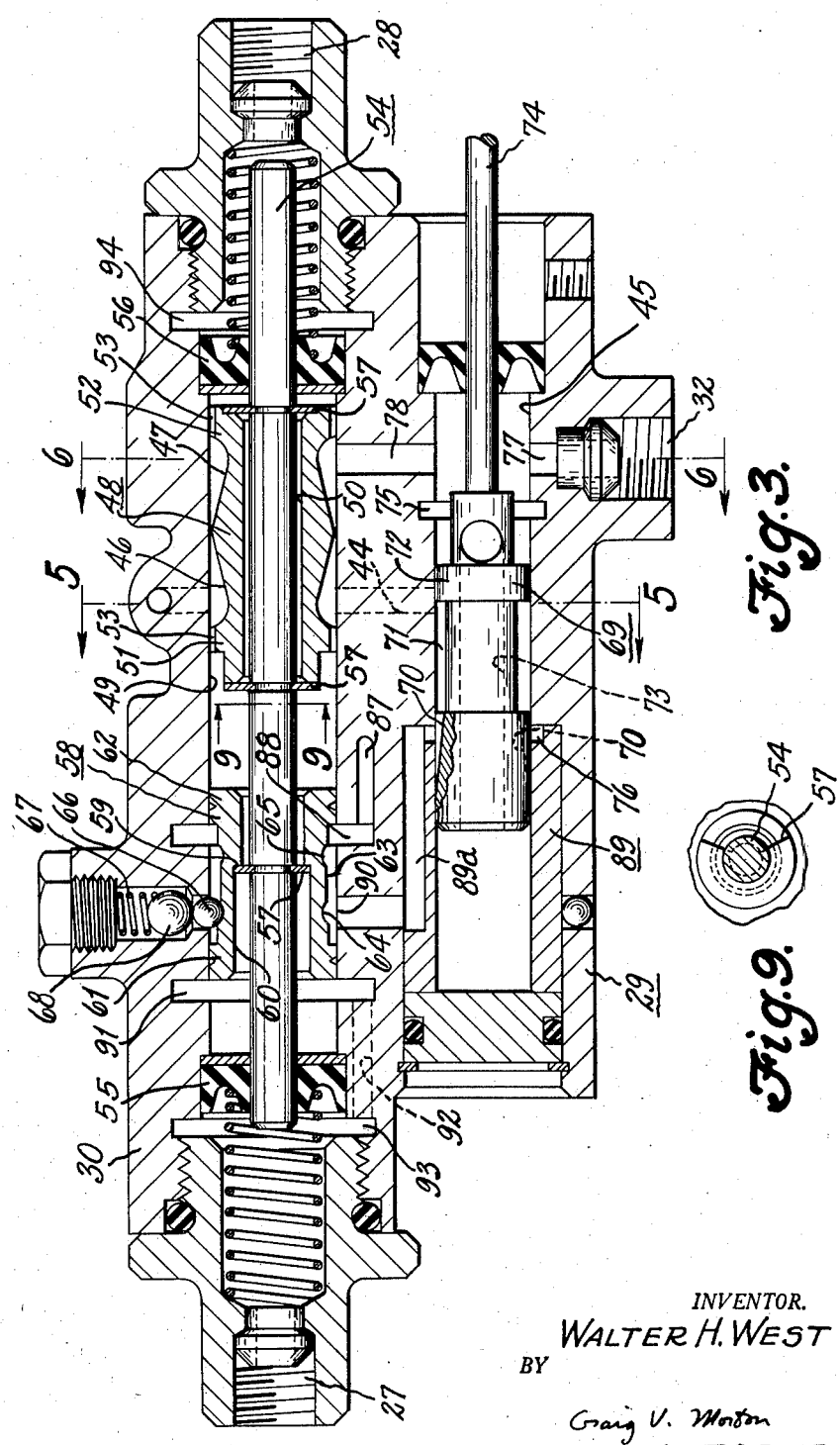

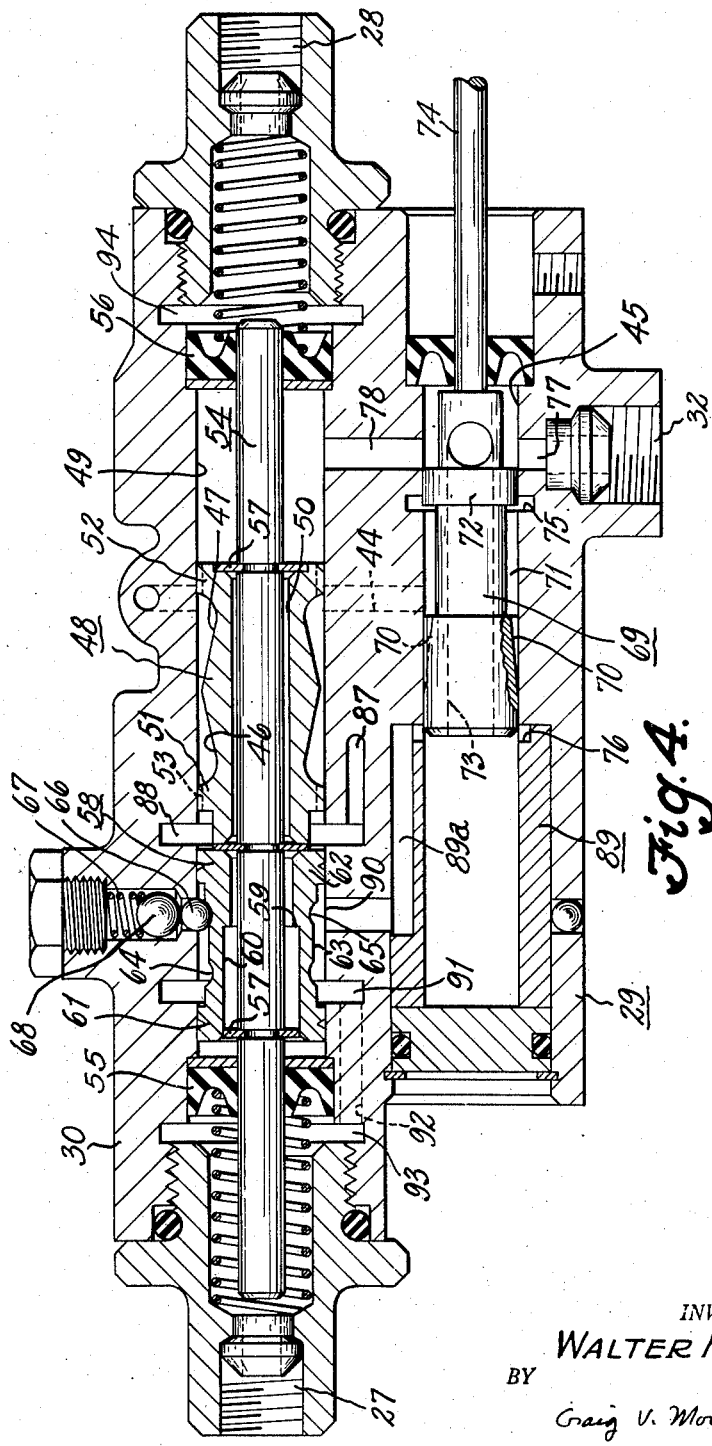

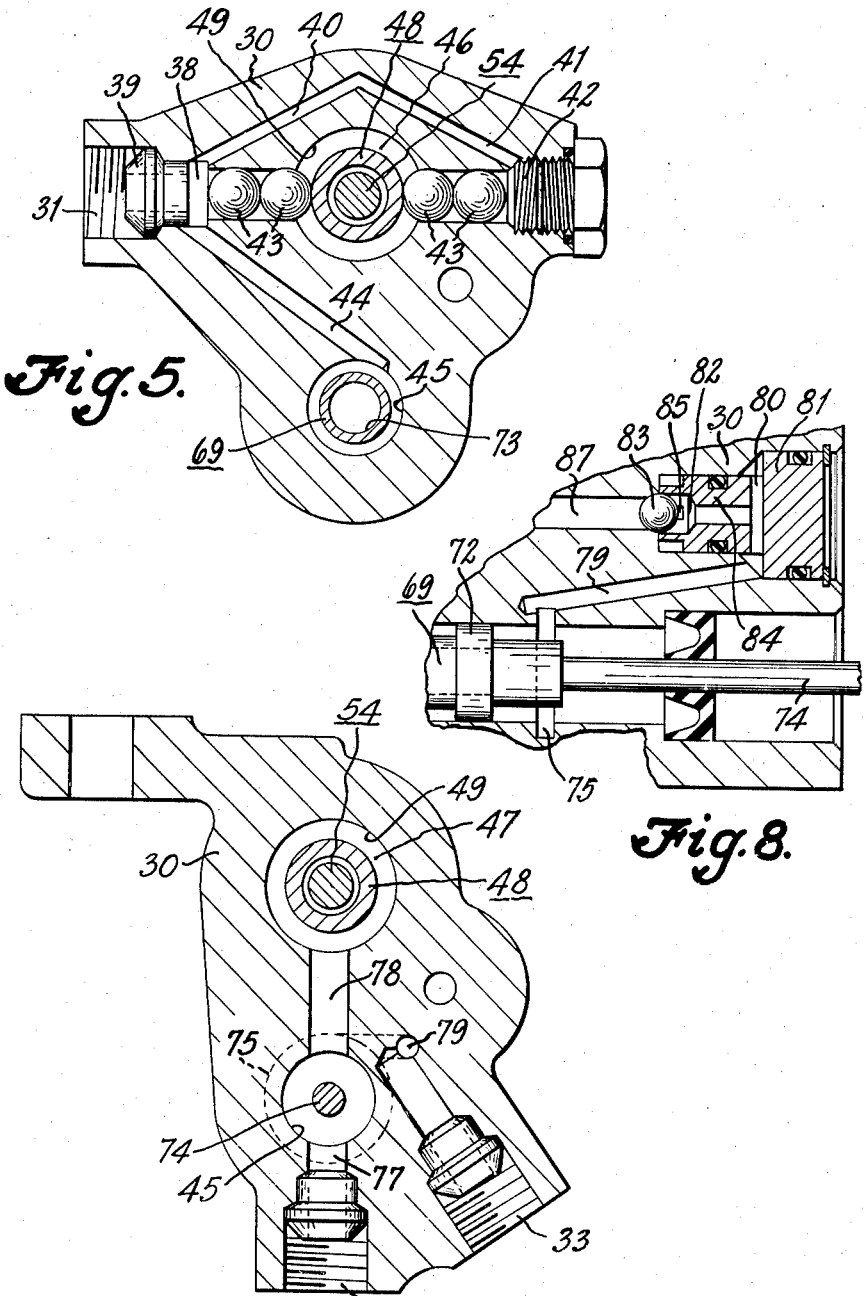

United States Patent Office 2,829,626
Patented Apr. 8, 1958

2,829,626

ALTERNATOR VALVE ASSEMBLY FOR A FLUID PRESSURE OPERATED WINDSHIELD WIPER MOTOR

Walter H. West, Bay City, Mich., assignor to General Motors Corporation, Detroit, Mich., a corporation of Delaware Application January 12, 1956, Serial No. 558,690

10 Claims. (Cl. 121—150)

This invention pertains to windshield wipers, and particularly to an alternator valve assembly for controlling the operation of a fluid pressure operated windshield wiper motor.

Heretofore, it has been proposed to control the operation of a fluid pressure actuated windshield wiper motor, or a plurality of wiper motors by a remotely located reversing, or alternator, valve assembly. A suitable alternator valve assembly for controlling windshield wiper motors wherein the motor piston is parked adjacent one end of its running stroke is disclosed and claimed in copending application Serial No. 558,703, filed of even date herewith, in the name of Wysong et al. The present invention relates to an improved alternator valve assembly specifically designed for controlling a fluid pressure actuated windshield wiper motor wherein the motor piston is parked beyond one end of its normal running stroke. Accordingly, among my objects are the provision of an alternator valve assembly for automatically reversing the pressure and drain connections of a pair of control ports; the further provision of an alternator valve assembly including means for controlling the rate of fluid flow therethrough; and the still further provision of an alternator valve assembly including a manual control valve and means for interrupting the reversal of fluid flow at the control ports and apply pressure fluid to a parking port to extend the stroke of the windshield wiper motor for parking purposes.

The aforementioned and other objects are accomplished in the present invention by designing the alternator valve assembly to operate on a pressure build up at the alternator control ports when the windshield wiper motor reaches the ends of its running stroke. Specifically, the alternator control valve assembly is disposed within a valve body, or casing, and includes a manually operable metering control and parking valve, a detent spool and a reversing valve spool. The valve casing has an external pressure inlet port, an external drain port, a pair of external control ports and a parking port. More particularly, the instant alternator valve assembly is designed to control a fluid pressure operated windshield wiper motor of the type disclosed in copending application Serial No. 558,640, filed of even date herewith in the name of Bohnhoff et al., and assigned to the assignee of this invention. Thus, the two external pressure control ports of the alternator valve assembly are connected by hydraulic lines to opposite ends of the wiper motor cylinder, while the parking port is connected by a hydraulic line to the motor parking port.

The position of the manually operable control valve can be varied to control the rate of fluid flow from the inlet port to the control ports when it is in the "on" position through metering grooves. When the control valve is in the "off" position, the rate of fluid flow cannot be varied, and when the wiper motor piston reaches the "park" position, flow will cease and the system will become static. In addition, when the wiper motor is parked, the reversing valve spool is positioned to direct pressure fluid to the opposite expansible motor chamber so as to immediately activate the wiper motor when the manual control valve is moved to the "on" position.

The reversing valve spool has a central through bore of stepped diameter, a pair of axially spaced lands which define an annular groove therebetween, and a pair of axially spaced detent grooves adapted to receive a spring-biased detent ball which determines the limit positions of the reversing valve spool. The reversing valve spool is supported for reciprocable movement in a bore of the casing which communicates with a plurality of internal ports. A reciprocable push rod having piston surfaces at opposite ends is disposed in the valve casing bore, the rod extending through the bore in the valve spool. The valve spool is connected through lost motion means to move in one direction with the push rod by a C-shaped snap ring which abuts a shoulder formed in the stepped bore thereof. The valve spool is connected to move with the detent spool in the opposite direction through lost motion means.

The detent spool also has a central bore through which the push rod extends, the two spools being mounted for reciprocable movement within the same valve bore. However, the detent spool is connected with the rod for movement in both directions by a pair of C-shaped snap rings. In addition, the detent spool has a lost motion connection with the reversing valve spool so as to be capable of moving the reversing valve spool in the opposite direction. The detent spool also has a pair of oppositely inclined ramps which are adapted to be alternately engaged by plurality of fluid pressure biased detent balls. When the wiper motor piston reaches either end of its running stroke, the system, or working pressure, will build up to the inlet line pressure and shift the push rod, the detent spool and the reversing valve spool to maintain the motor piston in a state of continuous movement during running operation. When the control valve is moved to the "off" position, fluid under pressure will bypass the reversing spool valve and be applied directly to the parking motor chamber to move the piston beyond one end of its normal running stroke and interrupt motor operation. When the control valve is in the "on" position, the alternator parking port is connected to drain.

Further objects and advantages of the present invention will be apparent from the following description, reference being had to the accompanying drawings wherein a preferred embodiment of the present invention is clearly shown.

In the drawings:

Fig. 3 is an enlarged sectional view taken along line 3—3 of Fig. 2 with the control valve in the "on" position.

Fig. 4 is a view similar to Fig. 3 with the control valve in the "off" or "park" position.

Figs. 5 and 6 are sectional views taken along lines 5—5 and 6—6 of Fig. 3.

Figure 7:
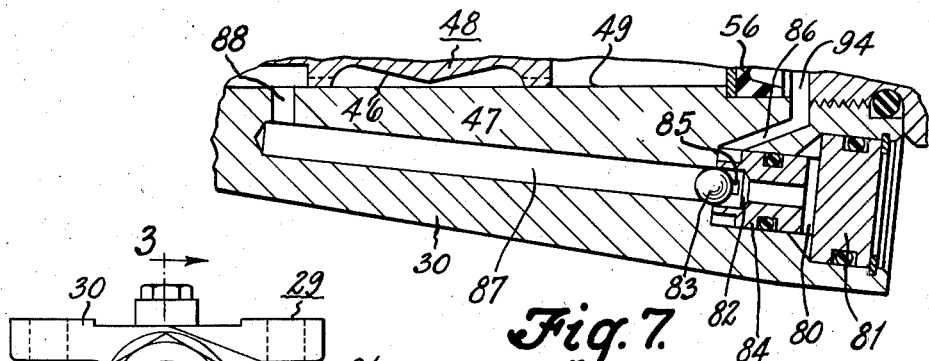
Figure 2:
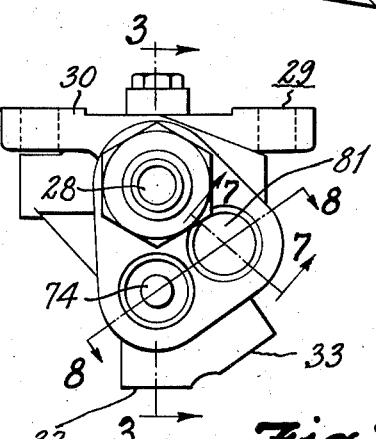
Fig. 2 is an enlarged view, in elevation, of the alternator valve assembly taken in the direction of arrow 2 in Fig. 1.

Figs. 7 and 8 are enlarged fragmentary views taken along lines 7—7 and 8—8 of Fig. 2.

Fig. 9 is a fragmentary sectional view taken along line 9—9 of Fig. 3.

Figure 10:
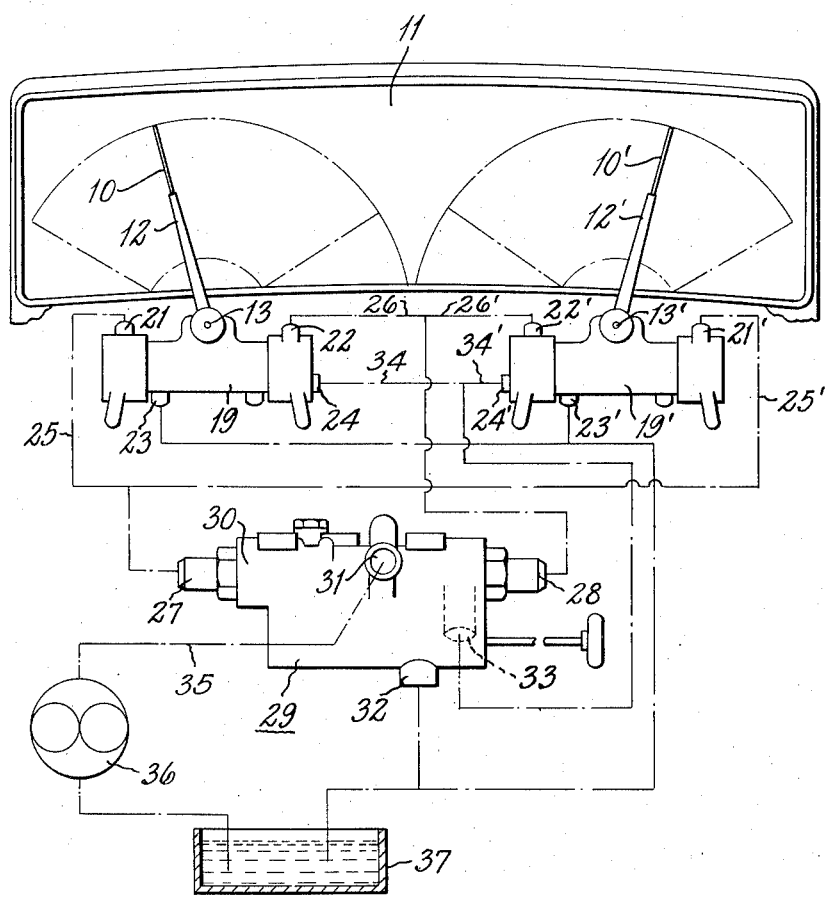

Fig. 10 is a schematic view depicting windshield cleaning mechanism including an independent wiper motor for each blade, the motors being controlled by the alternator valve assembly of this invention.

Figure 1:
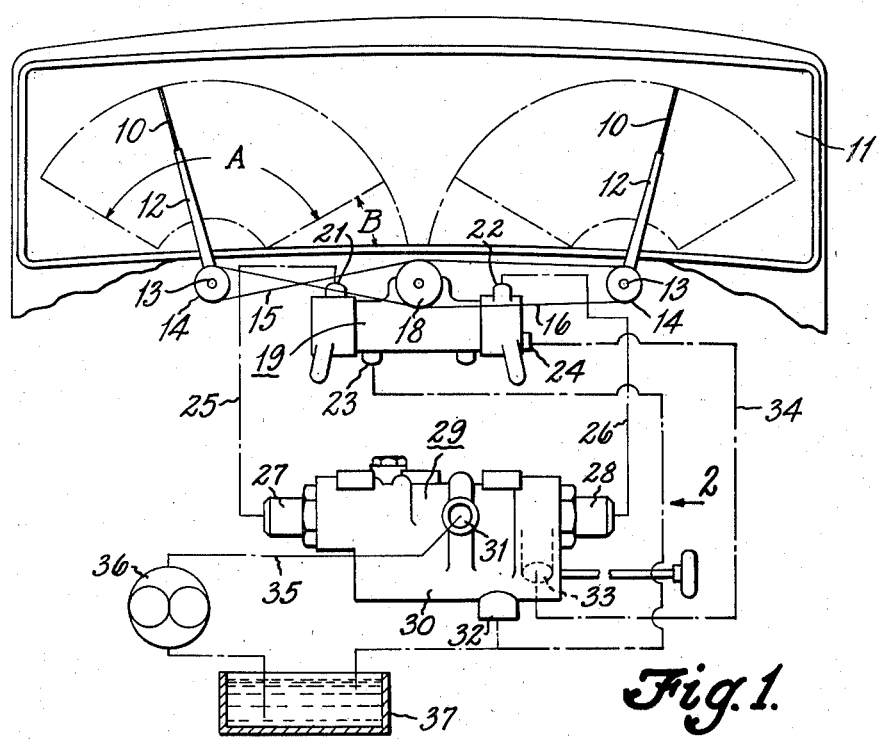
Fig. 1 is a schematic view, partly in section and partly in elevation, illustrating a windshield wiper mechanism including the alternator valve assembly of this invention.

With particular reference to Fig. 1, vehicle windshield wiper mechanism is depicted comprising a pair of wiper blades 10, arranged for simultaneous asymmetrical movement across a windshield 11. The blades 10 are carried by arms 12, which are driven by transmission shafts 13. The shafts 13 carry pulley assemblies 14, which are connected by cable drives 15 and 16 to an auxiliary drive pulley 18. The blades 10 are arranged for movement throughout a wiping stroke, indicated by A, during operation of the wiper motor 19, and are moved throughout the angle B to a parked position when the motor 19 is deactivated. Structurally, the wiper motor 19 is of the type disclosed in the aforementioned copending application, Serial No. 558,640, and, thus, includes a pair of running ports 21 and 22, a drain port 23 and a parking port 24. The wiper motor piston, not shown, imparts oscillation to the shaft which carries pulley 18.

The motor control ports 21 and 22 are connected by conduits 25 and 26, respectively, to control ports 27 and 28, respectively, of an alternator control valve assembly, generally depicted by the numeral 29. The valve assembly 29 includes a casing, or body, 30 having a pressure inlet port 31, a drain port 32 and a parking port 33. The parking port 33 of the valve assembly is connected by conduit 34 with the parking port 24 of the wiping motor 19. The inlet pressure port 31 is connected by a conduit 35 to the outlet side of an hydraulic pump 36, the inlet of which is connected to a sump, or reservoir, 37. Likewise, drain ports 23 of the motor 19 and 32 of the valve assembly 29 are connected by conduits to the sump 37.

With particular reference to Fig. 5, the pressure inlet port 31 of the valve assembly communicates with an internal passage 38 through an annular sealing member 39, the passage 38 being connected by intersecting bores 40 and 41 to a diametrically opposed passage 42. A pair of detent balls 43 are snugly received in the passages 38 and 42, and since these passages are connected to the pressure inlet 31, the balls 43 are fluid pressure-biased inwardly, as viewed in Fig. 5. In addition, the passage 38 is connected by a passage 44 with a valve body bore 45. The detent balls 43 are arranged to engage diametrically opposed surfaces of either ramp 46 or ramp 47 formed on a detent spool 48, as shown in Fig. 3, the spool 48 being disposed within a valve body bore 49.

With particular reference to Figs. 3 and 4, it may be seen that the detent spool 48, in addition to having the opposed ramps 46 and 47, has a bore 50 therethrough, and a pair of axially spaced guide lands 51 and 52 having passages 53 therethrough. A reciprocable push rod 54 is coaxially disposed within the bore 49, opposite ends of the push rod being supported by seal assemblies 55 and 56 through which the ends of the push rod extend. The detent spool 48 is connected for movement in both directions with the push rod 54 by a pair of C-shaped snap rings 57, the elevation of which is depicted in Fig. 9.

The valve assembly also includes a reversing spool valve 58, connected through lost motion means for movement with the push rod 54 to the right by a C-shaped snap ring 57, which is arranged to abut a shoulder 59 in the stepped through bore 60 of the spool 58. However, the spool 58 is not connected for movement to the left with the push rod 54, and the push rod 54 extends through the stepped bore 60. However, the valve spool 58 has a lost motion connection with the detent spool 48 for movement to the left. The spool valve 58 is also formed with a pair of axially spaced sealing lands 61 and 62, which define an annular groove 63 therebetween. The body of the spool valve 58 is formed with a pair of axially spaced detent grooves 64 and 65 adapted to receive a detent ball 66, which is spring-biased into engagement therewith by a spring 67 through a ball 68.

A manually operable control valve 69 is mounted for reciprocable movement within the valve body bore 45. The valve 69 is formed with a pair of diametrically opposed metering grooves 70 adjacent one end, an annular groove 71, a land 72 and an internal passage 73, which connects the left-hand end of the valve 69 with the bore 45 on the right-hand side of the land 72. The valve 69 is connected to an axially extending rod 74, which extends without the valve body for manual operation between the positions depicted in Figs. 3 and 4.

The valve body bore 45 is connected with the pressure inlet port 31 through passage 44. The bore 45 is circumscribed by annuli 75 and 76 and also communicates through a passage 77 with drain port 32. The bores 49 and 45 are interconnected by a passage 78. As seen in Figs. 6 and 8, the annular groove 75 communicates with a passage 79, the passage 79 connecting with the parking port 33, as well as a chamber 80 in the valve body. The chamber 80 is closed at one end by a plug 81 and has disposed therein a seat 82 for a ball 83. The seat 82 is formed by an annular cage member 84 having a plurality of slots, as indicated by numeral 85, which interconnect the chamber 80 with a passage 86 when the ball 83 seats against the end of a passage 87. The passage 86 is connected with the external control port 28, shown in Figures 2, 3 and 4. The passage 87 communicates with an annular groove 88 formed around the body bore 49, which is controlled by the spool valve 58.

The annulus 76 connects with a passage 89a in a sleeve 89, which, in turn, connects with a pressure supply port 90 for the spool valve 58, as seen in Figs. 3 and 4. In addition, the body bore 49 is circumscribed by an annular groove 91, which is connected by passage 92 with a chamber 93 that communicates with the control port 27. Actually, the passage 86 communicates with the control port 28 through a similar chamber 94, as seen in the drawings.

It is thus apparent that the valve body bore 49 is at all times connected to the drain port 32 through passage 78, the valve body bore 45 and passage 77. Since fluid under pressure from the inlet port 31 is always metered, or throttled, by the manual control valve 69, the pressure at the ports 27 and 28 is always less than the pressure in conduit 35 during movement of the wiper motor piston. However, when the wiper motor piston reaches the ends of its running stroke, the pressure at the control port will gradually rise to the inlet pressure and thereby shift the push rod 54, as will be described more particularly hereinafter.

*Operation*

When the manually operable control valve 69 is in the "on" position, as depicted in Fig. 3, the pressure and drain connections of control ports 27 and 28 will be automatically reversed by the valve spool 58 in the following manner. In the position of the valve spool, as depicted in Fig. 3, port 28 is connected to pressure through chamber 94, passage 86, passages 85 in the cage member 84, passage 87, the annular grooves 88 and 63, port 90, passage 89a, annular groove 76, metering grooves 70, annular groove 71 and passage 44 to the pressure inlet port 31. At this time, the port 27 is connected to drain through chamber 93, passage 92, annular groove 91, valve spool bore 60, valve body bore 49, passages 53 in the detent spool 48, passages 77 and 78, and the drain port 32. The rate of fluid flow from the pressure inlet port to the control port 28, and, hence, the speed of wiper motor operation, can be varied by adjusting the position of the valve 69. More particularly, as the valve 69 is moved to the right, as viewed in Fig. 3, the rate of fluid flow will be reduced since the valve 69 is shown in the high-speed position in Fig. 3. As soon as the wiper motor piston reaches the end of its running stroke with pressure at port 28, the pressure in the chamber 94 will gradually build up to that of the pressure at the inlet port 31 and will, thus, react on the right-hand piston surface of the push rod 54 so as to move the push rod 54 to the left. As the push rod 54 moves to the left, its movement is opposed by the fluid pressure biased detent balls 43, which are in engagement with ramp surface 46 of the detent spools. However, as soon as the detent spool 48 is moved so that the balls 43 engage detent surface 47, the lost motion between the detent spool 48 and the reversing valve spool 58 will be taken up and the detent spool 48 and push rod 54 will effect snap-like movement of the reversing valve spool 58 from the position depicted in Fig. 3 to the position depicted in Fig. 4 wherein detent ball 66 engages groove 65.

With the reversing valve spool 58 in the position shown in Fig. 4, the pressure and drain connections of ports 27 and 28 will be reversed. Thus, port 27 will be connected to pressure through chamber 93, passage 92, annular grooves 91 and 63, port 90, passage 89a, annular groove 76, metering grooves 70, annular groove 71, passage 44, and the pressure inlet port 31. At the same time, port 28 will be connected to drain through chamber 94, passage 86, passage 85 in the cage member 84, passage 87, annular groove 88, passages 53 in the detent spool 48, valve body bore 49, passages 77 and 78 and the drain port 32. When the wiper motor piston reaches the other end of its running stroke, the pressure in chamber 93 will build up to the pressure at the inlet port 31, thus shifting the push rod 54 from the position of Fig. 4 to the position of Fig. 3 and in so doing, the left-hand snap ring 57 will engage the shoulder 59 of the detent spool 58 and shift the detent spool from the position of Fig. 4 to the position of Fig. 3. Thus, during running operation with the control valve 69 in the "on" position, the pressure and drain connections of ports 27 and 28 are automatically reversed to maintain the wiper motor in a state of continuous movement throughout the running stroke. At this time, the parking port 33 is connected to the drain port 32 through passage 79, annular groove 75, the valve body bore 45 and passage 77.

When it is desired to interrupt operation of the wiper motor, the control valve 69 is manipulated through the rod 74 to move the control valve 69 to the position of Fig. 4. This manipulation can occur at any time without regard to the position of the reversing valve spool 58 and the detent spool 48. With the control valve 69 in the position of Fig. 4, pressure fluid from the inlet port 31 flows through passage 44 to the valve body bore 45. Since the metering land of the control valve 69 blocks communication between the passage 44 and the annular groove 76, the annular groove 76 and the ports and passages connected therewith are connected to drain through the valve passage 73, passage 77 and port 32. Thus, port 27 is connected to drain by movement of the manual control valve to the "off" or "park" position. Moreover, if the reversing valve spool 58 and the detent spool 48 are in the position of Fig. 3, they will be shifted to the position of Fig. 4 by fluid pressure in chamber 94 when the motor piston reaches the "park" position. This result occurs since the port 28 is connected to the pressure inlet 31 when the control valve 69 is in the position of Fig. 4 through chamber 94, passage 86, passages 85 in the cage member 84, chamber 80, passage 79, annular groove 75, and passage 44. When pressure is admitted to chamber 80, the ball valve 83 will move into sealing engagement with the right-hand end of passage 87 so as to prevent port 28 from being connected to drain through the reversing spool valve 58. However, during running operation, chamber 80 is connected to drain and, hence, the ball 83 will engage its seat 82 in the cage member 84 so as to interconnect passage 87 with the port 28 through chamber 94, passage 86 and the passages 85 in the cage member 84. With the control valve 69 in the position of Fig. 4, the parking port 33 will be connected to the pressure inlet through passage 79, annular grooves 75 and 71, and passage 44. Thus, the stroke of the wiper motor piston will be extended and when the piston reaches the parked position, all flow will cease and the system will become static.

It is noted that when the wiper motor is parked, the reversing spool valve 58 is in the position of Fig. 4, and, thus, will immediately supply pressure fluid to port 27 to initiate wiper motor operation as soon as the control valve 69 is moved to the "on" position.

With reference to Fig. 10, a vehicle cleaning installation wherein each wiper blade is driven by an independent hydraulic motor is depicted, similar reference numerals depicting similar parts throughout the several views. Thus, the wiper blades 10, 10' are connected to arms 12, 12' which are attached to transmission shafts 13, 13'. In Fig. 10, the cable drive arrangement is eliminated, and the shafts 13, 13' are directly connected to wiper motors 19, 19' which are hydraulically synchronized by the alternator control valve assembly 29. Thus, the motor control ports 21, 22 and 21', 22' are connected by conduits 25, 26 and 25', 26', respectively, to control ports 27 and 28 of the alternator valve assembly. The parking port 33 of the valve assembly is connected by conduits 34 and 34' to parking ports 24 and 24' of the motors 19 and 19', respectively. Operation of the system disclosed in Fig. 10 is the same as that described hereinbefore. The drain ports 23, 23' of the motors 19 and 19' are connected by conduits to the sump 37.

From the foregoing, it is readily apparent that the present invention provides an alternator valve assembly specifically designed for controlling a fluid pressure operated windshield wiper motor, or a plurality of wiper motors, having a parked position outside of the normal running stroke. It is further apparent that with the instant alternator valve assembly, the reversing valve means are automatically conditioned to initiate wiper motor operation when the manual control valve is moved to the "off" or "park" position.

While the embodiment of the present invention as herein disclosed, constitutes a preferred form, it is to be understood that other forms might be adopted.

What is claimed is as follows:

1. An alternator valve assembly for automatically reversing the pressure and drain connections of a pair of control ports including, a valve body having a pressure inlet port, a drain port, a parking port and a pair of control ports, reversing valve means disposed in said body, said reversing valve means having connections with said control ports and two limit positions wherein the pressure and drain connections of said control ports are reversed, means for actuating said reversing valve means, and a manually operable control valve having connections with said reversing valve means, said control ports, said drain port, said pressure port and said parking port for bypassing said reversing valve means, connecting one of said control ports to pressure, blocking the connection between said control port and said reversing valve means, connecting the other control port to drain and connecting said parking port to pressure.

2. An alternator valve assembly for automatically reversing the pressure and drain connections of a pair of control ports including, a valve body having a pressure inlet port, a drain port, a parking port and a pair of control ports, reversing valve means disposed in said body, said reversing valve means having two limit positions wherein the pressure and drain connections of said control ports are reversed, means for actuating said reversing valve means, and a manually operable control valve in said body for bypassing said reversing valve means to connect one of said control ports and said parking port to pressure and the other of said control ports to drain.

3. An alternator valve assembly for automatically reversing the pressure and drain connections of a pair of control ports including, a valve body having a pressure inlet port, a drain port, a parking port and a pair of control ports, reversing valve means disposed in said body, said reversing valve means having two limit positions wherein the pressure and drain connections of said control ports are reversed, means for actuating said reversing valve means, a manually operable control valve for bypassing said reversing valve means and connecting said parking port to pressure and one of said control ports to drain, and fluid pressure actuated means for connecting the other control port to pressure when said reversing valve means is bypassed by said control valve.

4. The alternator valve assembly set forth in claim 3 wherein said last recited means including a valve seat and a fluid pressure actuated ball adapted for sealing engagement with the valve seat, and wherein the ball blocks communication between said reversing valve means and said other control port when said ball engages said seat and connects said other control port to pressure, and passage means in said valve body for applying pressure to said ball when said manual control valve is positioned so as to bypass said reversing valve means.

5. The alternator valve assembly set forth in claim 4 including a second valve seat for said fluid pressure actuated ball, and means controlled by movement of said control valve to an "on" position for applying pressure fluid to said ball so as to move it into engagement with said valve seat wherein the ball permits communication between said reversing valve means and said other control port.

6. An alternator valve assembly for automatically reversing the pressure and drain connections of a pair of control ports including, a valve body having a pressure inlet port, a drain port, a parking port and a pair of control ports, reversing valve means disposed in said body, said reversing valve means having two limit positions wherein the pressure and drain connections of said control ports are reversed, means for actuating said reversing valve means, and a manually operable control valve in said body having an "on" position and an "off" position, said control valve including means for varying the rate of fluid flow from said pressure inlet port to said control ports in the "on" position and means for bypassing said reversing valve means and connecting said parking port to pressure when in the "off" position.

7. An alternator valve assembly for automatically reversing the pressure and drain connections of a pair of control ports including, a valve body having a pressure inlet port, a drain port, a parking port and a pair of control ports, reversing valve means disposed in said body, said reversing valve means having two limit positions wherein the pressure and drain connections of said control ports are reversed, means for actuating said reversing valve means, and a manually operable control valve in said valve body, said control valve having an "on" position wherein said pressure inlet port is connected to said reversing valve means and an "off" position wherein said reversing valve means is connected to said drain port and the pressure inlet port is connected to the parking port.

8. An alternator valve assembly for automatically reversing the pressure and drain connections of a pair of control ports including, a valve body having a pressure inlet port, a drain port, a parking port and a pair of control ports, a reversing valve spool disposed in said body for reciprocable movement, internal ports and passages in said valve body connectable with said pressure inlet port, said drain port and said control ports, said internal ports and passages communicating with said reversing valve spool, said reversing valve spool having two limit positions wherein the pressure and drain connections of said control ports are reversed through said internal ports and passages, means for actuating said reversing valve, and a manually operable control valve for interrupting said internal ports and passages in the "off" position and completing the flow path through said internal ports and passages in the "on" position, said manual control valve connecting said parking port to pressure when it is in the "off" position.

9. The alternator valve assembly set forth in claim 8 wherein one of said control ports is connected to drain through said manual control valve when it is in the "off" position and wherein said valve assembly includes means for connecting the other control port to pressure when the manual control valve is in the "off" position.

10. An alternator valve assembly for automatically reversing the pressure and drain connections of a pair of control ports including, a valve body having a pressure inlet port, a drain port, a parking port and a pair of control ports, a reversing valve disposed in said body having two limit positions wherein the pressure and drain connections of said control ports are reversed, means for actuating the said reversing valve, a manually operable control valve movable to an "off" position for bypassing said reversing valve and connecting said parking port with the pressure inlet port, a chamber in said valve body connected to the pressure port by movement of said manual control valve to the "off" position, a pressure responsive ball valve having a fluid connection with said chamber, a pair of spaced valve seats for said ball valve, one of said valve seats comprising one end of a first passage in said valve body having its other end connected with said reversing valve, the other of said valve seats comprising a hollow cage having a plurality of peripheral slots, and a second passage in said valve body connecting said slots with one of said control ports, said ball being moved into engagement with the valve seat of said first passage by pressure in said chamber upon movement of said manual control valve to the "off" position so as to connect said one control port to pressure from said chamber through said slots and the second passage.

References Cited in the file of this patent

UNITED STATES PATENTS

| | | |
|---|---|---|
| 2,202,023 | Parker | May 28, 1940 |
| 2,404,747 | Sacchini | July 23, 1946 |
| 2,450,564 | Sacchini | Oct. 5, 1948 |
| 2,511,834 | Burns | June 20, 1950 |
| 2,722,200 | Horton et al. | Nov. 1, 1955 |

FOREIGN PATENTS

| | | |
|---|---|---|
| 473,296 | Great Britain | Oct. 11, 1937 |